United States Patent [19]

Cantatore

[11] 4,104,248

[45] Aug. 1, 1978

[54] POLYOLEFINE-BASED POLYMERIC COMPOSITIONS STABILIZED BY ORGANIC POLYAMINES, TEXTILE FIBERS OBTAINED THEREFROM, AND NOVEL ORGANIC POLYAMINES

[75] Inventor: Giuseppe Cantatore, Collescipoli (Terni), Italy

[73] Assignee: Montefibre S.p.A., Milan, Italy

[21] Appl. No.: 667,657

[22] Filed: Mar. 17, 1976

[30] Foreign Application Priority Data

Mar. 21, 1975 [IT] Italy .................... 21490 A/75
Mar. 21, 1975 [IT] Italy .................... 21491 A/75

[51] Int. Cl.$^2$ ............................ C08K 5/34
[52] U.S. Cl. .................. 260/45.8 N; 260/2 BP; 260/2 R; 260/897 R; 260/293.63; 260/293.64; 528/407
[58] Field of Search ............ 260/45.8 N, 293.63, 260/293.64, 2 BP, 2 R, 897 R

[56] References Cited

U.S. PATENT DOCUMENTS

| | | | |
|---|---|---|---|
| 2,599,974 | 6/1952 | Carpenter et al. | 260/2 EP |
| 3,436,368 | 4/1969 | Murray | 260/45.8 N |
| 3,527,846 | 9/1970 | Cappuccio et al. | 260/2 BP |
| 3,709,839 | 1/1973 | Cappuccio et al. | 260/2 BP |
| 3,840,494 | 10/1974 | Murayama et al. | 260/45.8 N |
| 3,887,517 | 6/1975 | Murayama et al. | 260/45.8 N |
| 3,904,581 | 9/1975 | Murayama et al. | 260/45.8 N |
| 3,971,795 | 7/1976 | Cook | 260/293.63 |
| 3,975,357 | 8/1976 | Murayama et al. | 260/45.8 N |

*Primary Examiner*—Eugene C. Rzucidlo
*Attorney, Agent, or Firm*—Stevens, Davis, Miller & Mosher

[57] ABSTRACT

A stabilized polyolefine-based polymeric composition is disclosed characterized in that it contains as stabilizer an organic polyamine having the general formula:

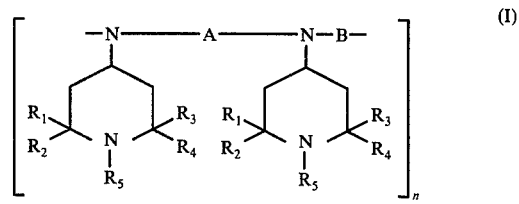

wherein
$R_1$, $R_2$, $R_3$ and $R_4$ are equal to or different from each other and are an alkyl group having from 1 to 4 carbon atoms;
$R_5$ is hydrogen or an alkyl group having from 1 to 4 carbon atoms;
A is an alkylene group having from 2 to 10 carbon atoms;
B is a divalent aliphatic, cycloaliphatic, aromatic or alkylaromatic radical, which can contain hetero atoms such as O, S, N and P either in the chain or as side substituents; and
$n$ is a whole number between 2 and 1000. The organic polyamine has an inherent viscosity of between 0.01 and 1 dl/g, and is employed in an amount equal to or less than 5% by weight. The stabilized polymeric composition may be in the form of fibers, filaments, films or other shaped articles. The organic polyamines themselves are novel, as are certain difunctional amine intermediates. Processes for preparing same are also disclosed.

12 Claims, No Drawings

POLYOLEFINE-BASED POLYMERIC COMPOSITIONS STABILIZED BY ORGANIC POLYAMINES, TEXTILE FIBERS OBTAINED THEREFROM, AND NOVEL ORGANIC POLYAMINES

The present invention relates to polymeric compositions based on alpha-olefine polymers stabilized against heat, light and ageing, as well as fibers, films, raffia, and other stabilized articles of manufacture obtained upon starting from said polymeric compositions.

The invention also relates to certain novel organic polyamines useful for effecting the stabilization as aforesaid.

As is well known, polyolefines, and in particular polypropylene, suffer a certain degradation during hot processing especially in the presence of atmospheric oxygen. Moreover, it is also well known that manufactured articles obtained starting from said polyolefins are sensitive to the action of light, to ageing and to heat.

The degrading action to which these polyolefins are subject, in general, is somewhat limited by the addition to the polymer of one or more protective substances; and in particular during the transformation of the polymer into fibers, films, or other similar shaped articles.

In general, for this purpose there are used small quantities of amines, phenolic compounds, aminophenols, thioazolic compounds, phosphites and thiophosphites, thioesters, thioethers, chelates of transition metals, organostannic compounds, carbamates and thiocarbamates, oximes, polyquinolines and the like, these substances being used either alone or in suitable combinations with each other.

The above-mentioned compounds, especially when used in suitable combinations with each other, allow one to achieve a stability of the alpha-olefine polymers which in practice is acceptable but nevertheless not altogether satisfactory.

In accordance with the present invention, it has been discovered that polyamines of the general formula:

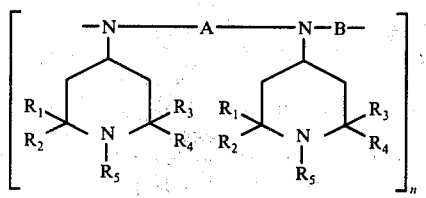

(I)

wherein
$R_1$, $R_2$, $R_3$ and $R_4$ are equal to or different from each other and are an alkyl group having from 1 to 4 carbon atoms;
$R_5$ is either hydrogen or an alkyl group having from 1 to 4 carbon atoms;
A is an alkylene group having from 2 to 10 carbon atoms;
B is a divalent aliphatic, cycloaliphatic, aromatic or alkylaromatic radical, containing optionally hetero atoms such as O, S, N and P in the chain or as side substituents; and
n is a whole number between 2 and 1000,
exert a stabilizing action on the polymers both as such as well as in the form of fibers, films, or other shaped articles.

Their stabilizing action is definitely superior to that of other compounds or mixtures of compounds so far suggested for this purpose.

Amongst suitable polyamines of the general formula (I), particularly preferred are those having an inherent viscosity ($\eta$inh) between 0.01 and 1 dl/g. The viscosity is determined in chloroform at 25° C according to the method reported below in the working examples.

The organic polyamines, which are incorporated into the polymer before or during extrusion into shaped articles in quantities equal to or less than 5% by weight, act as stabilizers to light, to heat and to ageing not only with respect to the alpha-olefine polymers but also with respect to compositions based on said polymers and basic nitrogen-containing polycondensates that, as is well known, provide fibers of improved dyeing characteristics. Said polyamines are also suitable for stabilizing compositions based essentially on polyolefines colored by the addition of organic or inorganic pigments.

The object of this invention is, thus, stabilized polymeric compositions based on a polyolefine containing as stabilizer an organic polyamine of the above-indicated general formula (I).

Another object of the invention is the provision of the novel organic polyamines themselves.

The quantity of organic polyamine to be added to the polyolefine for stabilization purposes is not critical even though in practice one prefers to maintain their quantity within values lower than 5% by weight. Moreover, it has been observed that even very small quantities of the organic polyamine, that is of the order of 0.1% by weight, are quite effective in the stabilization of the polyolefines.

The preferred polyolefine is polypropylene consisting essentially of isotactic macromolecules, and obtained by stereospecific polymerization of propylene by methods per se well known in the art.

However, equally suitable for application according to this invention are also polyolefines derived from monomers of the formula:
$R - CH = CH_2$, wherein R is an alkyl or aryl group, or a hydrogen atom; such as polyethylene, polybutene-1, polypentene-1, poly-4-methylpentene-1, polystyrene, and the like.

Amongst organic polyamines of the general formula (I), in practice those are preferred in which $R_5$ is hydrogen; $R_1$, $R_2$, $R_3$ and $R_4$ are each a methyl group; A is selected from the group consisting of $-(CH_2)_2-$ and $-(CH_2)_6-$; and B is selected from the class consisting of:

$-(CH_2)_2-$;

$-CH_2-\langle\bigcirc\rangle-CH_2-$;

$-CH_2-\underset{OH}{CH}-CH_2-\underset{R_6}{N}-CH_2-\underset{OH}{CH}-CH_2-$;

$-CH_2-\underset{OH}{CH}-CH_2-$;

$-CH_2-CH_2-O-CH_2-CH_2-$; and $\underset{OH}{\overset{CH_2}{\underset{|}{CH}}}-CH_2-O-\langle\bigcirc\rangle-\underset{CH_3}{\overset{CH_3}{\underset{|}{C}}}-\langle\bigcirc\rangle-O-CH_2-\underset{OH}{\overset{CH_3}{\underset{|}{CH}}}-CH_2$ wherein $R_6$ is an alkyl group containing from 1 to 18 carbon atoms.

Some examples of organic polyamines of the general formula (I) which may be used successfully in the stabilization of polyolefines according to this invention, are those having repeating units such as the following:

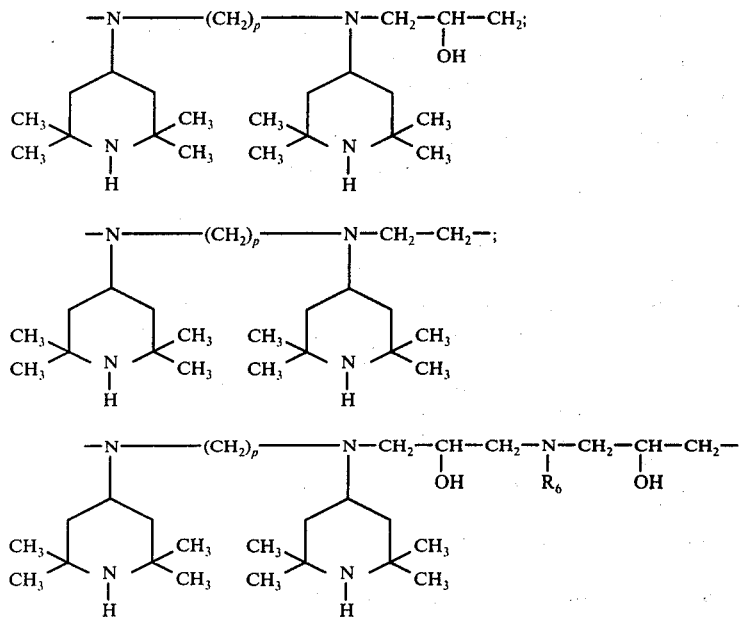

wherein $p$ is a whole number between 2 and 10, and $R_6$ has the value indicated above.

The organic polyamines (I) are generally obtained by polycondensation of difunctional amines (II):

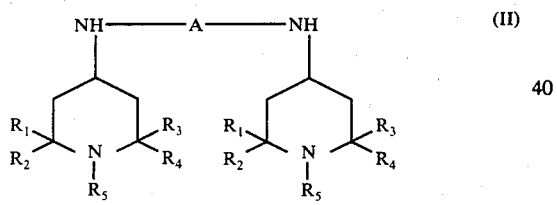

with a difunctional compound containing halogen atoms and/or epoxy groups, and suitable for forming the divalent radical B as defined above, as for instance dibromomethane, epichlorohydrin, p-xylylenedichloride, diepoxy compounds etc.

The polycondensation is carried out by reacting the difunctional amino compound with the difunctional dihalogenated or diepoxy or halogen-epoxy compound, according to per se conventional operating procedures, for example in the presence of an alkaline hydrate, to neutralize the thus-obtained hydrohalogen acid, at a temperature higher than room temperature and in the presence of an alcohol as reaction solvent.

It is preferable that the molar ratio between the two reactants shall be of the order of 1:1, but it is possible also to use different molar ratios that may vary between 1:0.5 and 1:2.

The polycondensed amino products of the present invention are of a resinous nature, soluble in methanol.

With regard to compound (II), this is obtained for instance by reacting an aliphatic diamine $H_2N—A—NH_2$ with a 2,2,6,6 tetraalkyl-substituted-4-piperidone and $H_2$ under pressure, and in the presence of a hydrogenation catalyst such as platinum, according to the following reaction:

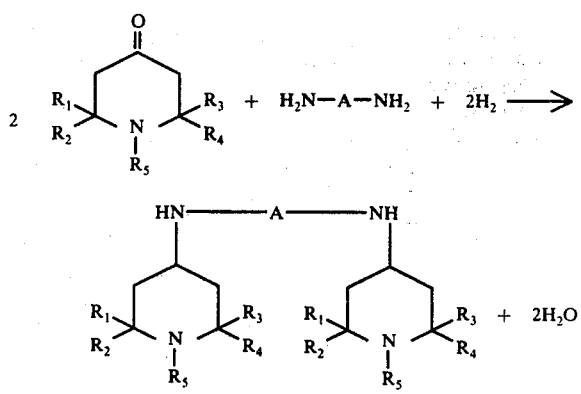

An organic polyamine having general formula (I) may be used alone or in admixture with other stabilizers heretofore known in the art such as oxy-benzotriazols, oxy-benzo-phenones, Ni-containing stabilizers, metal soaps, phenol antioxidizers, phosphites, thioesters, etc. An example of a polyolefinic composition stabilized with such a stabilizing mixture is:

(a) a polyolefine;
(b) a polyamine of the general formula (I) cited above, in quantities between 0.1% and 5%;
(c) a phosphite of the general formula:

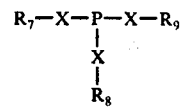

wherein X is 0 or S and $R_7$, $R_8$ and $R_9$ are equal to or different from each other and are alkyl, aryl or alkylaryl groups optionally substituted with different functional groups, in particular —OH, in quantities between 0.05 and 2%;

(d) a phenol antioxidizer of the general formula:

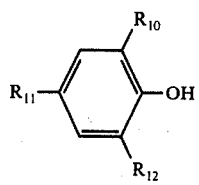

wherein $R_{10}$ and $R_{12}$ are equal to or different from each other, and are an alkyl group having from 1 to 12 carbon atoms, and $R_{11}$ is a monovalent or polyvalent radical selected from the group consisting of alkyl, aryl, alkylaryl, and cycloalkyl groups which can optionally contain hetero-atoms; and (e) a metal soap selected from the class consisting of Ca, Zn, Mg and the like stearates.

The mixing of the organic polyamine (I), or of the mixture containing the organic polyamine, with the polyolefine is generally carried out by simply mixing the powdery additives to the polyolefine under stirring.

However, it is possible to carry out the addition in other ways, such as for instance by mixing the polyolefines with a solution of the stabilizers in a suitable solvent followed by evaporation of the solvent, or by the addition of the stabilizers to the polyolefines at the end of polymerization thereof.

Moreover, it is also possible to bring about the desired stabilizing action by applying the stabilizing compound or mixture thereof to the manufactured article, for instance by immersing said article in a solution or dispersion of the stabilizers, and then evaporating the solvent or carrier.

The stabilizers according to this invention display good compatibility with the polyolefines in the molten state, and have no staining action.

The mixtures are granulated and successively extruded on conventional melt-spinning equipment, preferably with spinnerets having a length/diameter ratio greater than 1.

Granulation and spinning are carried out in the absence of oxygen, preferably in an atmosphere of inert gases (e.g., nitrogen).

During the course of mixing, the polyolefines may be additioned not only with the stabilizers of this invention but also with dulling agents and organic or inorganic pigment dyes.

The filaments obtained by extrusion are subjected to a stretching process with a stretching ratio between 2 and 10 at a temperature between 80° and 150° C, on stretching devices heated with hot air or steam, or with a similar fluid, or provided with a heating plate.

The stretched filaments are then subjected to a dimensional stabilizing treatment under free or controlled shrinkage conditions at 80° - 160° C.

The filaments obtained by extrusion from the mixtures of this invention may be either monofilaments or multifilaments and are useful for the preparation of continuous threads or staple fibers, or for the preparation of texturized or bulked yarns.

In addition to the preparation of yarns, the compositions according to this invention may be used for the preparation of films, raffia, ribbons, shaped articles, and the like.

The following are some examples still further illustrating without however limiting the invention:

EXAMPLE 1

Preparation of N,N'-bis(2,2,6,6-tetramethyl-4-piperidyl) ethylenediamine 162.75 g (1.05 moles) of 2,2,6,6-tetramethyl-4-piperidone dissolved in 200 cc of methanol, 30 g (0.5 moles) of ethylenediamine dissolved in 40 cc of methanol, and 0.5 g of Pt (at 10% on carbon) were introduced into a 1 liter autoclave, and the mixture hydrogenated at 80° C and 50 atm pressure for 2 hours.

After removal of both catalyst and solvent the residue was distilled, thus obtaining 155.5 g (92%) of product, having a boiling point of 150°-151°/0.1 mm Hg; a melting point of 80°-81° C; and a found N content of 16.51% (calculated for $C_{20}H_{42}N_4$ = 16.56%).

Preparation of the polyamine

To a solution of 33.8 g (0.1 moles) of N,N'-bis(2,2,6,6-tetramethyl-4-piperidyl)ethylenediamine in 50 cc of methanol were admixed 9.25 g (0.1 moles) of epichlorohydrin. This mixture was heated under reflux for 10 hours, adding during the last 8 hours of heating, in small regular portions 4 g (0.1 moles) of sodium hydroxide in the form of tablets.

At the completion of the addition of NaOH, the mixture was heated under reflux for a further 2 hours. It was then filtered to separate the sodium chloride formed in the reaction.

The filtrate was dried by removing the methanol, first at atmospheric pressure at 70°-100° C and then by heating for 4 hours at 120° C and 1 mm Hg.

In this way there was obtained 39 g of a brittle resinous product, showing a light yellow color and an inherent viscosity of 0.14 dl/g and a content in nitrogen of 13.6%.

The inherent viscosity was determined at 25° ± 0.1° C with a solution at 0.5% in chloroform, using a Desreux-Bischoff viscosimeter.

The procedure was the following:

0.1 g of sample was dissolved in 20 cc of the solvent, under constant stirring for 30 minutes. The solution thus obtained was introduced into the viscosimeter and the flow times of the solution ($t_s$) and of the pure solvent ($t_o$) were measured.

From the ratio $t_s/t_o$ one obtains the relative viscosity ($\eta_{rel}$), from which the inherent viscosity ($\eta_{inh}$) may be calculated by the equation:

$$\eta_{inh} = ln\eta_{rel}/c$$

wherein c is the concentration expressed in g per 100 cc of solvent.

Stabilization tests

Test 1

25 g of the above reported polyamine were dissolved in 100 cc of methanol. The solution thus obtained was mixed together with:

5 kg of polypropylene having an intrinsic viscosity of 1.65 dl/g, a residue on heptane extraction of 96.5%, and an ash content of 80 ppm., and 5 g of calcium stearate.

This mixture was granulated in an extruder in an oxygen-free atmosphere at 180° C, and was then spun under the following conditions:

| | |
|---|---|
| Temperature of the screw | 250° C |
| Extruding head temperature | 230° C |
| Temperature of the spinneret | 230° C |
| Maximum pressure | 35 kg/cm² |

The spinneret used has 40 holes of 0.8 mm diameter and a length of 4 mm.

The filaments coming out of the spinneret were gathered at a rate of 500 meters/min. and were stretched at 130° C in a steam atmosphere with a stretch ratio of 3.3.

The filaments thus obtained showed the following characteristics:

| | |
|---|---|
| Titer | 17 dtex |
| Tenacity | 2.8 g/dtex |
| Elongation at break | 85% |
| Tenacity after 1400 hours of exposure to a Weatherometer | 1.8 g/dtex |
| (having a Xenon arc lamp of 6000 W, relat. hum. 30 ± 5% and black panel temperature of 63° ± 3° C). | |

For comparative purposes it should be noted that with the prior art stabilizers known so far, the tenacity is halved after about 500 hours of exposure.

Test 2

25 g of the above reported organic polyamine were dissolved in 100 cc of methanol. The solution thus obtained was admixed with:

5 kg of polypropylene having an intrinsic viscosity of 1.65 dl/g, a residue on heptane extraction of 96.5%, and an ash content of 80 ppm.;

5 g of pentaerythritol-tetrakis [3(3,5-ditert.-butyl-4-hydroxyphenyl)-propionate];

12.5 g of tri-n-dodecyl-phosphite; and 5 g of calcium stearate.

The mixture upon melting in a test tube at 250° C for 10 minutes appeared to be of a light color.

The mixture was granulated in an extruder in an oxygen-free atmosphere at 180° C, and was then spun under the same conditions of those of Test 1.

The filaments thus obtained showed the following characteristics:

| | |
|---|---|
| Titer | 17 dtex |
| Tenacity | 2.5 g/dtex |
| Elongation at break | 90% |
| Tenacity after 1400 hours of exposure to Weatherometer | 2.0 g/dtex. |

EXAMPLE 2

Preparation of N,N'-bis(2,2,6,6-tetramethyl-4-piperidyl)hexamethylenediamine 162.75 g (1.05 moles) of 2,2,6,6-tetramethyl-4-piperidone dissolved in 200 cc of methanol, 58 g (0.5 moles) of hexamethylenediamine dissolved in 70 cc of methanol, and 0.5 g of Pt (at 10% on carbon) were introduced into a 1 liter autocalve. The mixture was hydrogenated at 80° C and 50 atm pressure for 2 hours.

After removal of both the catalyst and the solvent the residue was distilled, thus obtaining 177 g (90%) of product having a boiling point of 180°–181° C/0.1 mm Hg; a melting point of 61°–62° C; and a found N content of 14.26% (calculated for $C_{24}H_{50}N_4$ = 14.21%).

Preparation of the polyamine

Operating according to Example 1, to a solution of 39.4 grams (0.1 moles) of N,N'-bis-(2,2,6,6-tetramethyl-4-piperidyl)-hexamethylenediamine in 50 cc of methanol, were admixed 9.25 g (0.1 moles) of epichlorohydrin, 43 g of a brittle resinous light yellow product were obtained, having an inherent viscosity of 0.18 dl/g and a nitrogen content of 12.01%.

Stabilization tests

Test 3

25 g of the above reported polyamine, dissolved in 100 cc of methanol, were mixed together with the same products and with the same quantities as those indicated in Test 2. The mixture was granulated and extruded under the same conditions as in Test 1.

The filaments thus obtained, after stretching in steam at 130° C with a stretch ratio of 3.3, showed the following characteristics:

| | |
|---|---|
| Titer | 17 dtex |
| Tenacity | 2.4 g/dtex |
| Elongation at break | 94% |
| Residual tenacity after 1400 hours exposure to the Weatherometer | 1.8 g/dtex. |

Test 4

25 g of the above reported polyamine were dissolved in 100 cc of methanol. The solution thus obtained was admixed with:

5 kg of polypropylene having an intrinsic viscosity of 1.65 dl/g, a residue on heptane extraction of 96.5%, and an ash content equal to 80 ppm.; and 5 g of calcium stearate.

This mixture was granulated and extruded under the same conditions as in Test 1.

The filaments coming out of the spinneret were gathered at a rate of 500 meters/min., and were then stretched in a steam atmosphere at 130° C with a stretch ratio of 3.3.

The filaments thus obtained showed the following characteristics:

| | |
|---|---|
| Titer | 17 dtex |
| Tenacity | 2.6 g/dtex |
| Elongation at break | 102% |
| Tenacity after 1400 hours exposure to the Weatherometer | 1.7 g/dtex. |

EXAMPLE 3

Preparation of the polyamine

The conditions of Example 1 were repeated except that there were used 74 g (0.2 moles) of N-bis-(2-oxy-3-chloropropyl)-n-dodecylamine dissolved in 100 cc of methanol, and 67.6 g (0.2 moles) of N,N'-bis-(2,2,6,6-tetramethyl-4-piperidyl)-ethylenediamine dissolved in 120 cc of methanol. Moreover, during the last 8 hours of the heating there were additioned, in small regular portions, 16 grams (0.4 moles) of sodium hydroxide in the form of tablets.

121 g of a solid soft light yellow product were obtained, having an inherent viscosity of 0.15 dl/g and a content in nitrogen of 10.45%.

Stabilization test

With the above reported polyamine there was prepared a mixture with the same products and the same quantities as indicated above in Test 2. The mixture was then granulated and spun and the filaments thus obtained were stretched by operating under the same conditions as those specified above in Test 1.

The filaments showed the following characteristics:

| Titer | 17 dtex |
|---|---|
| Tenacity | 2.4 g/dtex |
| Elongation at break | 100% |
| Residual tenacity after 1400 hours exposure to the Weatherometer | 1.5 g/dtex |

EXAMPLE 4

Preparation of the polyamine 33.8 g (0.1 moles) of N,N'-bis-(2,2,6,6-tetramethyl-4-piperidyl)-ethylenediamine, 34 g (0.1 moles) of 2,2-bis[4-(2,3-epoxypropoxyphenyl]-propane, and 100 cc of methanol were heated under reflux for 8 hours.

The solvent was thereupon removed by heating first at atmospheric pressure up to 100° C and then at 120° C for 2 hours at 1 mm Hg. 67 g of a brittle, resinous, light yellow product were obtained, having an inherent viscosity of 0.21 dl/g and a nitrogen content of 8.18%.

Stabilization test

The above reported polyamine was admixed with the same compounds and in the same quantities as in Test 2 above.

The mixture was then granulated and extruded and the filaments thus obtained were stretched under the same conditions as those indicated above in Test 1.

The filaments showed the following characteristics:

| Titer | 17 dtex |
|---|---|
| Tenacity | 2.6 g/dtex |
| Elongation at break | 90% |
| Time of exposure to the Weatherometer necessary for halving the initial tenacity | 1200 hours. |

EXAMPLE 5

Preparation of the polyamine 78.8 g (0.2 moles) of N,N'-bis-(2,2,6,6-tetramethyl-4-piperidyl)-hexamethylenediamine, 37.6 g (0.2 moles) of 1,2-dibromoethane, and 130 cc of isopropanol were heated under reflux for 20 hours, adding during the last 16 hours of heating, in small regular portions, 16 g (0.4 moles) of NaOH tablets.

After completion of the addition of NaOH, the mixture was heated under reflux for a further 4 hours. The reaction mixture was then diluted with 150 cc of benzene, and then filtered to separate the thus-obtained sodium bromide.

The filtrate was brought to dryness by heating first up to 100° C at atmospheric pressure, and subsequently under vacuum (for 2 hours at 120° at 1 mm Hg).

81 g of a solid brittle resinous light yellow product were obtained, having an inherent viscosity of 0.12 dl/g and a nitrogen content of 12.95%.

Stabilization test

The above reported polyamine was admixed in the same quantities with the same substances as indicated above in Test 2. From the thus obtained mixture a granulate was prepared which was then extruded under exactly the same conditions as indicated above in Test 1.

The resulting filaments, stretched in a steam atmosphere at 130° C with a stretch ratio of 3.3, showed the following characteristics:

| Titer | 17 dtex |
|---|---|
| Tenacity | 2.5 g/dtex |
| Elongation at break | 95% |
| Residual tenacity after 1400 hours of exposure to the Weatherometer | 1.7 g/dtex. |

COMPARATIVE EXAMPLE 6

The mixture of Test 2, without the polyamine, was granulated and extruded under the same conditions as in Test 1.

The thus obtained filaments, stretched in steam at 130° C with a stretch ratio of 3.3, showed the following characteristics:

| Titer | 17 dtex |
|---|---|
| Tenacity | 2.4 g/tex |
| Elongation at break | 95% |
| Time of exposure to the Weatherometer necessary for halving the initial tenacity | 150 hours. |

What is claimed is:

1. A stabilized polyolefine-based polymeric composition characterized in that it contains as stabilizer and a stabilizing amount of an organic polyamine having the following general formula:

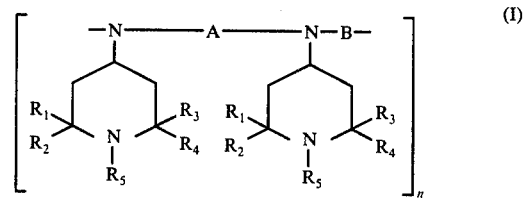

wherein
$R_1$, $R_2$, $R_3$ and $R_4$ are equal to or different from each other and are an alkyl group having from 1 to 4 carbon atoms;

$R_5$ is hydrogen or an alkyl group having from 1 to 4 carbon atoms;

A is an alkylene group having from 2 to 10 carbon atoms;

B is a divalent aliphatic cycloaliphatic, aromatic or alkylaromatic radical, which can contain hetero atoms such as O, S, N and P either in the chain or as side substituents; and n is a whole number between 2 and 1000.

2. A stabilized polymeric composition according to claim 1, characterized in that the organic polyamine of the general formula (I) has an inherent viscosity of between 0.01 and 1 dl/g.

3. A stabilized polymeric composition according to claim 1, wherein $R_1$, $R_2$, $R_3$ and $R_4$ are each a methyl group and $R_5$ is hydrogen.

4. A stabilized polymeric composition according to claim 1, wherein the quantity of the organic polyamine is equal to or less than 5% by weight.

5. A stabilized polymeric composition according to claim 4, wherein the quantity of organic polyamine is between 0.1 and 5% by weight.

6. A stabilized polymeric composition according to claim 1, wherein the organic polyamine of general formula (I) is used in admixture with other stabilizers such as oxy-benzotriazols, oxy-benzo-phenones, Ni-containing stabilizers, metal soaps, and with antioxidizers such as phenol, phosphite and thioester antioxidizers.

7. A stabilized polymeric composition according to claim 1, in the form of fibers, filaments, films and other shaped articles.

8. A stabilized polymeric composition according to claim 1, wherein the polyolefine is polypropylene.

9. A stabilized polymeric composition according to claim 8, wherein the polypropylene is isotactic polypropylene.

10. A poly (2,2,6,6-tetraalkyl-4-piperidyl)amine having the general formula:

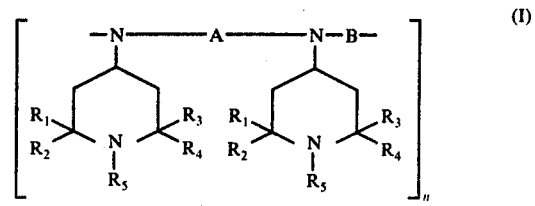

in which
- $R_1$, $R_2$, $R_3$ and $R_4$ are equal to or different from each other and are an alkyl group having 1 to 4 carbon atoms;
- $R_5$ is hydrogen or an alkyl group containing 1 to 4 carbon atoms;
- A is an alkylene group having 2 to 10 carbon atoms;
- B is a divalent aliphatic, cycloaliphatic, aromatic or alkylaromatic radical, which can contain heteroatoms such as O, N, S or P, either in the chain or as side substituents; and
- n is an integer from 2 to 1000.

11. A poly (2,2,6,6-tetra-alkyl-4-piperidyl) amine according to claim 8, wherein $R_1$, $R_2$, $R_3$ and $R_4$ are each a methyl group and $R_5$ is hydrogen.

12. A process for preparing a poly (2,2,6,6-tetra-alkyl-4-piperidyl) amine of claim 10 consisting essentially in condensing a difunctional amine of claim 10 with a difunctional compound containing halogen and/or epoxy groups, suitable to incorporate therein the divalent radical B as defined in claim 10.

* * * * *

UNITED STATES PATENT AND TRADEMARK OFFICE
CERTIFICATE OF CORRECTION

PATENT NO. : 4,104,248

DATED : August 1, 1978

INVENTOR(S) : CANTATORE

It is certified that error appears in the above-identified patent and that said Letters Patent is hereby corrected as shown below:

Claim 11, line 2, for "claim 8,"

read -- claim 10, --.

Claim 12, line 3, for "of claim 10" read

-- having the general formula:

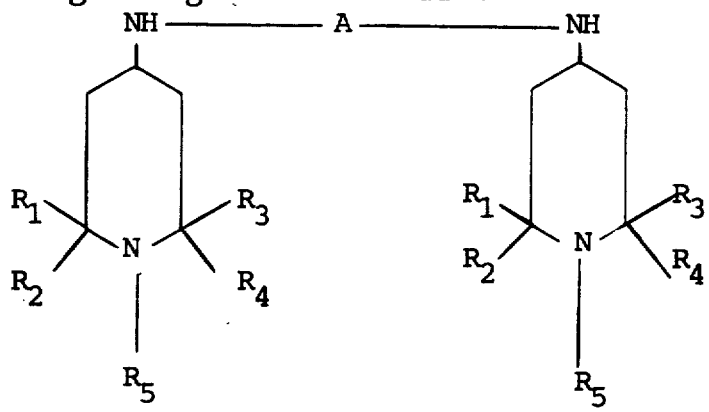

UNITED STATES PATENT AND TRADEMARK OFFICE
CERTIFICATE OF CORRECTION

PATENT NO. : 4,104,248

DATED : August 1, 1978

INVENTOR(S) : CANTATORE

It is certified that error appears in the above-identified patent and that said Letters Patent is hereby corrected as shown below:

wherein $R_1$, $R_2$, $R_3$ and $R_4$ are equal to or different from each other and are an alkyl group having from 1 to 4 carbon atoms;

$R_5$ is hydrogen or an alkyl group containing 1 to 4 carbon atoms; and

A is an alkylene group having from 2 to 10 carbon atoms, --.

This certificate supersedes Certificate of Correction issued October 29, 1985.

Signed and Sealed this

Twenty-fifth Day of February 1986

[SEAL]

Attest:

DONALD J. QUIGG

Attesting Officer

Commissioner of Patents and Trademarks